(12) United States Patent
Pilzner

(10) Patent No.: US 10,395,075 B2
(45) Date of Patent: Aug. 27, 2019

(54) RFID APPARATUS AND METHOD FOR COMMUNICATING WITH AT LEAST ONE RFID TRANSPONDER

(71) Applicant: SICK AG, Waldkirch (DE)

(72) Inventor: Olaf Pilzner, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 15/644,337

(22) Filed: Jul. 7, 2017

(65) Prior Publication Data

US 2018/0025191 A1 Jan. 25, 2018

(30) Foreign Application Priority Data

Jul. 19, 2016 (DE) ........................ 10 2016 113 302

(51) Int. Cl.
*G06K 7/10* (2006.01)
*G06K 17/00* (2006.01)

(52) U.S. Cl.
CPC ..... *G06K 7/10366* (2013.01); *G06K 7/10029* (2013.01); *G06K 7/10118* (2013.01); *G06K 7/10297* (2013.01); *G06K 17/0022* (2013.01)

(58) Field of Classification Search
CPC ................................................ G06K 7/10366
USPC ........................................................ 235/451
See application file for complete search history.

(56) References Cited

U.S. PATENT DOCUMENTS

| 2005/0274799 | A1* | 12/2005 | Torchalski | ............. | B41J 3/4075 |
| | | | | | 235/432 |
| 2006/0284727 | A1* | 12/2006 | Steinke | .............. | G06K 19/0723 |
| | | | | | 340/10.31 |
| 2008/0122581 | A1* | 5/2008 | Bae | ....................... | G06K 7/0008 |
| | | | | | 340/10.2 |
| 2008/0280560 | A1* | 11/2008 | Tuttle | .................. | H04B 5/0062 |
| | | | | | 455/41.2 |
| 2010/0214071 | A1 | 8/2010 | Nagai et al. | | |
| 2011/0090062 | A1* | 4/2011 | Hofer | ...................... | G01S 13/75 |
| | | | | | 340/10.31 |
| 2012/0161931 | A1* | 6/2012 | Karmakar | ............. | G01S 13/753 |
| | | | | | 340/10.1 |

(Continued)

FOREIGN PATENT DOCUMENTS

| EP | 2 490 150 A1 | 8/2012 |
| EP | 2562676 A1 | 2/2013 |

(Continued)

OTHER PUBLICATIONS

Office Action dated Jan. 27, 2017 issued in corresponding German Application No. 10 2016 113 302.7.

*Primary Examiner* — Allyson N Trail
(74) *Attorney, Agent, or Firm* — Nath, Goldberg & Meyer; Jerald L. Meyer; Stanley N. Protigal

(57) ABSTRACT

An RFID apparatus for communicating with at least one RFID transponder is provided that has an RFID transceiver for radiating and receiving RFID signals and a control unit that is configured to encode RFID information into the RFID signal in accordance with an RFID protocol or to read it from the RFID signal and in which a singulation process is implemented to give a command to only one respective RFID transponder. The singulation process in this respect checks a communication parameter of the RFID signal itself that is independent of RFID information encoded in the RFID signal.

19 Claims, 4 Drawing Sheets

(56) References Cited

U.S. PATENT DOCUMENTS

2013/0127601 A1\* 5/2013 Thomas, Jr. ............. G06K 7/01
                                                              340/10.51
2014/0347165 A1 11/2014 Bremer
2016/0063286 A1\* 3/2016 Nikunen ............ G06K 7/10158
                                                              340/10.34

FOREIGN PATENT DOCUMENTS

| | | |
|---|---|---|
| EP | 2 955 541 A1 | 12/2015 |
| JP | 2009-124197 A | 6/2009 |

\* cited by examiner

RFID APPARATUS AND METHOD FOR COMMUNICATING WITH AT LEAST ONE RFID TRANSPONDER

FIELD

The invention relates to an RFID apparatus for communicating with at least one RFID transponder that has an RFID transceiver for radiating and receiving RFID signals and a control unit that is configured to encode RFID information into the RFID signal in accordance with an RFID protocol or to read it from the RFID signal and in which a singulation process is implemented to give a command to only one respective RFID transponder and to a method for communicating with at least one RFID transponder, wherein RFID signals are transmitted to the RFID transponder and are received by the RFID transponder, wherein RFID information is encoded in the RFID signals in accordance with an RFID protocol, and wherein a command is given to only one respective RFID transponder on the basis of a singulation process.

BACKGROUND

RFID systems serve for the identification of objects and products and are used inter alfa to automate logistical movements. RFID transponders fastened to the products are read out at an identification point, above all on a change of the owner of the product or on a change of the transport means, and information is optionally written back into the transponder. This results in fast and traceable logistical movements. The detected information is used to control the forwarding, storage, and sorting of goods and products.

The RFID transponders are excited by electromagnetic radiation of the read/write system, also called an interrogator, for radiating the stored information, wherein passive transponders draw the required energy from the transmission energy of the reading system and the less customary active transponders have their own supply for this purpose. Passive transponders are read in accordance with the backscatter method in the established ultrahigh frequency standard EPC Generation 2 UHF RFID, whose air interface is defined in ISO 180000-6, mainly looked at here.

Singulation is a challenge in RFID communications. What is meant by this is that a simultaneous transmission of a plurality of transponders should be avoided to avoid interference and incorrect associations. The singulation should above all take place very simply and without any coordination effort on the side of the transponders since only very limited calculation resources are available there and since the time window of the contact would also be too short for a complex synchronization in many applications.

The anti-collision process defined in ISO 18000-6 in principle also makes possible singulation for transponders of identical content. Each transponder is first addressed individually and independently of its content in the so-called inventory and is asked to communicate. In broad strokes, the time duration of the inventory, also called a round, is divided into $2^{Q-1}$ slots. Q is a parameter that the interrogator sets such that in view of an expected or known number of transponders in the reading field the probability of a random collision is small without losing all too much response time through empty slots in so doing.

Each transponder in reading range now generates a random number using the Q parameter. The transponder only responds in the slot thereby fixed during the inventory and is otherwise silent so as not to interfere with the communication between the interrogator and other transponders. The transponder can inter alia communicate its unique identification parameter (UII—unique identification identifier also referred to as a unique item identifier) to the interrogator in its fixed slot. After completion of the inventory, the interrogator thus knows all the transponders with which communication is possible. Since the transponders fix their slots randomly independently of one another, collisions are not precluded. The interrogator must recognize this and must start a new inventory, where necessary with a different Q.

The interrogator can also obtain deeper access to the transponder in the course of an inventory, i.e. can communicate and execute an access command. In this respect, a transponder having a specific UII is looked for as a rule. As soon as a transponder with the sought UII therefore responds in a slot of the access inventory, a handle is requested, the command is transmitted to the transponder with this handle, is executed there and is acknowledged.

This procedure starts from the basis that the UII is actually only allocated once within the total transponder population so as never to locate two transponders having the same UII simultaneously in the reading field. The access command would otherwise be executed by all the transponders that satisfy the condition within the inventory, namely here having the same UII. The number of transponders participating in an inventory can admittedly be narrowed down by filters transmitted to the transponders beforehand. Identical UIIs would, however, also not prevent a simultaneous participation in the context of such filters. The inventory would in the best scenario, depending on the implementation in the interrogator, still recognize that a UII has been awarded a multiple of times, but would subsequently no longer be able to distinguish or separately address the associated transponders.

It is, however, unlike with RF transponders, actually the responsibility of the operator to provide this uniqueness of the UIIs. As a rule, a stack or a roll of transponders having identically pre-programmed UIIs are delivered and an initial writing with different UIIs is therefore required before the actual operation.

The known singulation is therefore not suitable to initially assign a UII to a specific transponder and to store it there for further operation. Instead, the transponders have to be isolated in a geometrically physical manner so that communication takes place with exactly the desired transponder by corresponding structures and a targeted choice of the transmission parameters of the interrogator. Some conceivable measures for this are a distance that is as small as possible between the interrogator and the transponder, a reduction of the transmission power to the smallest possible degree, construction measures that shadow other transponders or a suitable linear polarization. In addition, a SELECT mask can be set for the UII of the manufacturer set ex works, said mask, however, only separating the totality of the new transponders from possible further transponders. All this is complex and also not even possible in every situation. If the artificial singulation fails, all the transponders accidentally also addressed receive the write command to the UII and then have the same new UII among one another in the future.

An initial content should frequently also be written to the transponder with the UII, with this content being predefined as a simple label or in an outer packaging of the transponder, for instance in the form of a text, barcode or 2D code. The association between the transponder and this information must accordingly be secured at exactly this point in time. Otherwise, not only false UIIs would be allocated, but other transponder data would also be compromised.

Some transponder types have a serial number programmed by the manufacturer in a different memory sector than that for the UII. This would then allow a singulation with the aid of SELECT masks and the initial UII could also be assigned in this manner. This is a comparatively time-consuming operation, particularly since the serial numbers must first also still be read from the transponders. Transponders having pre-programmed serial numbers are also more of an exception so that this approach is at best a part solution.

A not insubstantial effort has to be made overall for the unambiguous association of a command to a specific known transponder. The UII initialization is associated with expensive designs and is only possible with a restricted pulsing. This will frequently not be possible "on the object", but rather requires an additional manual process, for example using a hand-held device.

SUMMARY

The invention therefore has the object of simplifying the singulation.

This object is satisfied by an RFID apparatus and by a method for communicating with at least one RFID transponder in accordance with the respective independent claim. The RFID apparatus is also called an interrogator, RFID reader or RFID read/write apparatus, since an RFID apparatus is also typically able to write. A singulation process is implemented in a control unit for communication with a plurality of RFID transponders in the range of the RFID apparatus to be able to give commands to only one respective RFID transponder. Such commands are usually read commands or write commands to read data of the RFID transponder or to store said data there; however, there are also other commands that, for example, trigger a change of state in the RFID transponder.

The invention now starts from the basic idea of linking the singulation process to a condition of the communication per se that is detected in a communication parameter. What is meant by this is that is contents not encoded in the RFID signal, that is the RFID information exchanged in accordance with the RFID protocol, that are used, but rather properties that are derived independently of the RFID information from the RFID signal and in particular from the carrier wave itself. The communication parameter is thus also independent of data that are stored on the RFID transponder. The check of the communication parameter is preferably not intended as a replacement, but rather as an addition to known singulation processes. The use of the term communication parameter in the singular is only a linguistic simplification and includes a combined assessment of a plurality of communication parameters.

The invention has the advantage that further criteria are created to decide which RFID transponder receives a command. This is also possible without the efforts in an initialization of the UII described in the introduction. The singulation is thereby expanded in a suitable manner and covers situations that could previously lead to ambiguities.

The communication parameter is preferably a level of the RFID signal. The level, for example the RSSI (received signal strength indicator) mainly depends on the spacing between the RFID apparatus and the RFID transponder, but also on which materials the RFID signal has to pass through and on which orientation the RFID transponder has with respect to the RFID apparatus. The RSSI thus differs a lot more from the front side and rear side of an object in dependence on the material than the geometrical dimensions of the object would bring about. If the RSSI is used as the criterion for the initialization of the UII, it is in any case sufficient to move the RFID transponder to be written close to the RFID apparatus; shadowing designs are superfluous. However, also apart from this simple example, the RSSI of two RFID transponders recognizably differ in a large number of real application cases and thus enable singulation.

A different preferred example for the communication parameter is the phase or the phase angle of the RFID response with respect to the RFID transmission signal. The phase is dependent both on the spacing and on the orientation of the RFID transponder to the RFID apparatus and, despite the ambiguity modulo of the wavelength, a random coincidence of the phases of two RFID transponder communications is more unlikely in real application cases.

The communication parameter is preferably a direction (DOA, direction of arrival) from which the RFID signal is received. This direction is checked, for example, as an angle corridor and can, for example, be determined from a phase measurement using two antennas.

A further example for a communication parameter is the speed of the RFID transponder that can be measured via the Doppler effect.

The communication parameters can be combined. This inter alia enables a localization in space from a phase measurement using at least two antennas, with the ambiguity with respect to the wavelength being able to be resolved by the RSSI.

The RFID apparatus is preferably configured for the UHF range in accordance with ISO 180000-6. The singulation process defined there can be expanded in accordance with the invention by a check of the communication parameter. In this respect, the communication protocols defined in the standard are preferably observed so that the RFID apparatus remains fully compatible.

The control unit is preferably configured to determine the communication parameter during an inventory. The inventory is defined in ISO 180000-6. In addition to this, it is possible to detect further communication parameters and they will be stored when needed later.

The inventory preferably divides a time duration of a round into a plurality of slots and the control unit acknowledges the response in each slot, provided that exactly one RFID transponder responds therein, and subsequently receives the unique identification parameter UH of the responding RFID transponder. It is understood that the RFID transponders likewise have to be configured in accordance with ISO 180000-6 for this purpose. However, no expansion is required at all for the RFID transponders to carry out the singulation in accordance with the invention.

The control unit is preferably configured to check the communication parameter in an expanded inventory for the output of commands to a specific RFID transponder. The expansion of the singulation in accordance with ISO 180000-6 is therefore directly linked to the existing inventory or access inventory and only adds additional queries of the communication parameter. This is simple to implement and continues to conform to the standard. The communication parameter is preferably detected beforehand in a conventional inventory; a transponder is therefore addressed in a targeted manner by a previously measured communication parameter. It is, however, alternatively also conceivable first to determine the communication parameter in the expanded inventory and directly subsequently to compare it with a specification that also enables a singulation without knowledge of the communication parameters of other RFID transponders. The specification of a very narrow angle corridor or a very strong RSSI are examples. This can namely practically not be simultaneously satisfied by two RFID transponders.

The control unit is preferably configured to give a write command for setting the unique identification parameter UII to a specific RFID transponder. The singulation strategy supplemented in accordance with the invention, in particular the expanded inventory in accordance with the previous paragraph, is therefore used to solve the initialization problem of the UII. If an unambiguous initialization of the UII in the transponder population is ensured in this manner despite UIIs initially set the same at the manufacturer's and despite identical contents of the RFID transponders overall, communication can thus otherwise take place in a conventional manner again. This kind of initialization is substantially more flexible and thus more favorable and faster than the previous procedure. Transponders disposed next to one another only have to have a recognizable spacing from one another; an artificial shadowing for a physical suppression of the communication of a plurality of RFID transponders can be dispensed with. The RFID transponders can remain at the objects since the selection is still possible, for example, via the RSSI, the phase or the DOA. RFID transponders can even be initialized in a stacked manner because, for example, the respective topmost RFID transponder not yet initialized can be selected via the RSSI and the phase at least under suitable framework conditions.

The control unit is preferably configured to select RFID transponders having a predefined unique identification parameter UII. A select to a specific UII should be sufficient per se for a singulation in accordance with ISO 180000-6 and this is also the case after an initialization such as in the preceding paragraph, for instance. With a UII awarded a multiple of times from the manufacturer's, a corresponding select, however, at least provides that up to the completion of the initialization only those RFID transponders are addressed that still bear the manufacturer's UII or that conversely those RFID transponders are actually not asked.

The control unit is preferably configured to give a dummy command to a responding RFID Transponder having a correct unique identification parameter UII, but not having a matching communication parameter. This serves for a simple expansion of the inventory in accordance with ISO 180000-6 since the behavior remains unaffected as much as possible. The RFID transponder only distinguished via the communication parameter executes the correct command. A further RFID transponder that likewise has to execute the command in accordance with all conventional criteria does not need any special treatment since this RFID transponder also receives a command and therefore also responds as usual with a confirmation of operation. The command is, however, a dummy command that does not change anything in the RFID transponder, but satisfies the defined communication protocol and ends correctly for this RFID transponder.

The control unit is preferably configured to start an initialization with write commands for setting the unique identification parameter UII when more than one RFID transponder responds with the same unique identification parameter UII. This corresponds to an automatic initialization as soon as two or more RFID transponders having the same UII have been recognized. This actually may not happen because the operation is only carried out with correctly initialized RFID transponders. If this is the case, however, repeat confusion is prevented by the new writing of the UII, in particular in different RFID systems that do not know or utilize the method in accordance with the invention.

The writing of the UII is not permitted in all applications; the RFID apparatus should have corresponding rights or control over its transponder population for this purpose.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
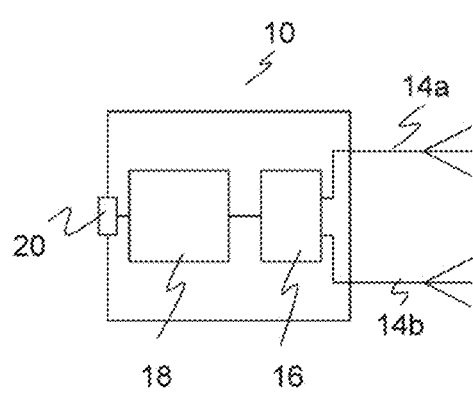
FIG. 1 a schematic overview representation of an RFID apparatus having a plurality of RFID transponders in reading range.
Figure 1:
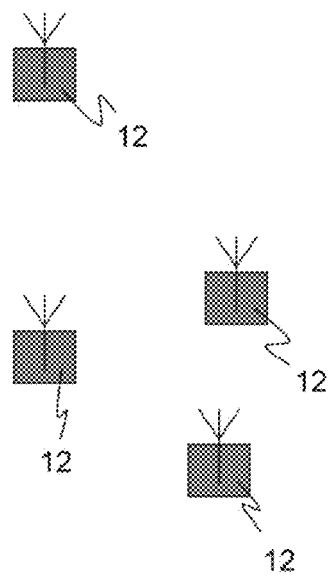

FIG. 1 shows a schematic overview representation of an RFID apparatus 10 and some RFID transponders 12 arranged in an exemplary manner in its reading range. The RFID apparatus 10 in this embodiment has two antennas 14*a-b* to be able to carry out a localization of the RFID transponders 12 over phase measurements of the incoming waves. In alternative embodiments, there is only one antenna or, conversely, there are further antennas.

The RFID apparatus 10 transmits and receives RFID signals via the antennas 14*a-b* with the aid of a transceiver 16. A control unit 18, for example having a digital module such as a microprocessor or an FPGA (field programmable gate array controls the routines in the RFID apparatus 10 and is able to encode RFID information into an RFID signal or to read RFID information from an RFID signal. A wired or wireless connector 20 serves to integrate the RFID reading apparatus 10 into a higher ranking system.

In detail, the communication preferably takes place in accordance with a known RFID protocol, in particular ISO 180000-16 or EPC Generation 2 UHF RFID, and the steps and components required for this are known per se so that only the aspects relevant to the understanding of the invention will be explained in more detail further below. The exact setup of the RFID reading apparatus 10 beyond the rough functional blocks is equally considered known.

A central problem of the communication between the RFID apparatus 10 and the RFID transponders 12 is the singulation. A plurality of RFID transponders 12 should not transmit simultaneously and the RFID apparatus 10 should be able to address an individual RFID transponder 12 in a targeted manner. The standard measure for the selection of specific RFID transponders 12 are filters by means of select, for instance, whereupon only RFID transponders 12 respond that satisfy the filter condition. In addition, each RFID transponder 12 has a unique identification parameter in a correctly set-up system.

Before a specific communication with an RFID transponder 12, for example to read or vary its data, the RFID apparatus 10 typically obtains an overview of the RFID transponders 12 present in the reading range as part of an inventory.

Figure 2:
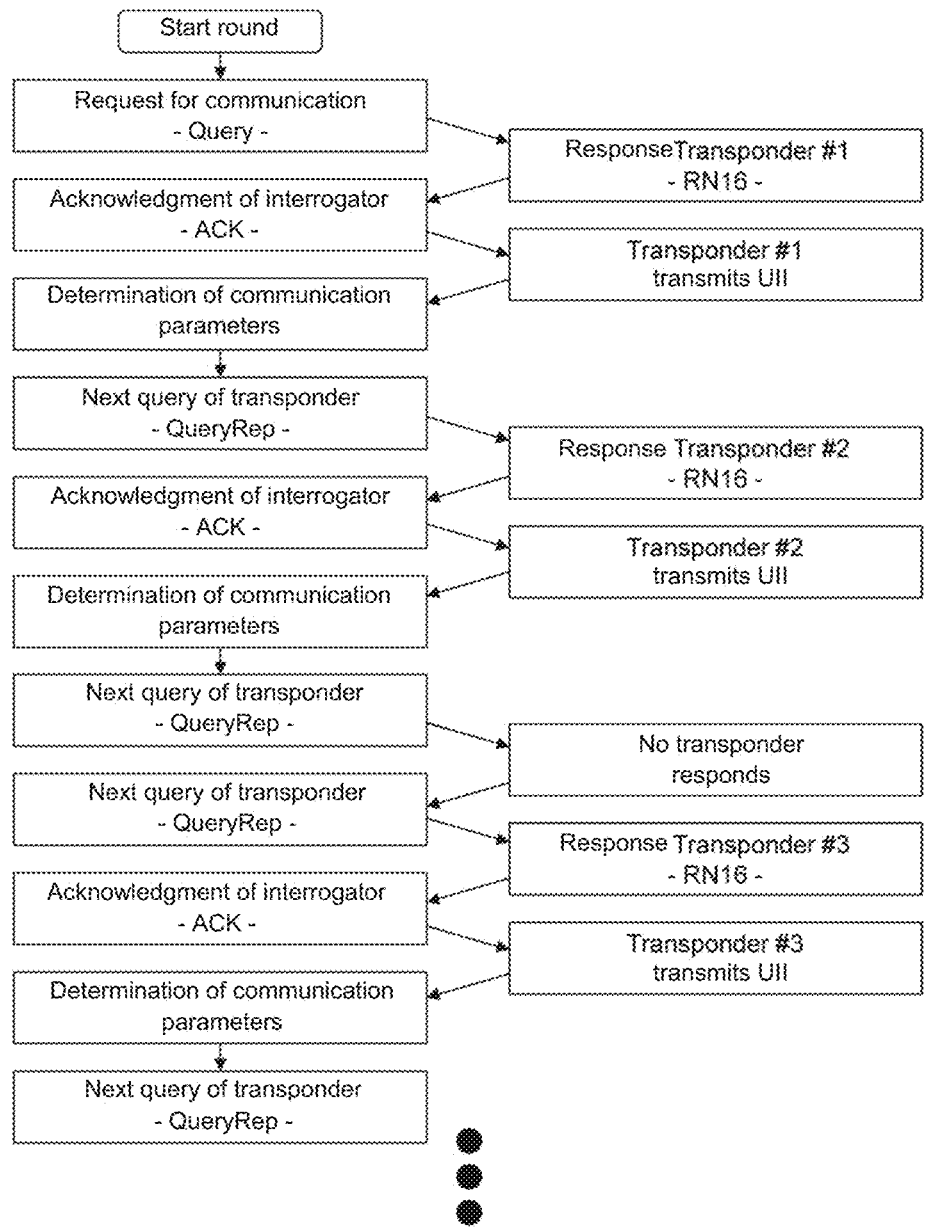
FIG. 2 an exemplary flowchart for an inventory in which the RFID transponders in reading range are detected together with their communication parameters.

FIG. 2 shows an exemplary routine of an inventory. It largely corresponds to the standard, but with additionally at least one communication parameter being determined and being stored in the RFID apparatus 10. Communication parameters are properties that are acquired from the RFID signal independently of the RFID information encoded therein such as a level (RSSI), a phase or a direction (DOA, direction of arrival). Communication parameters can be detected individually for both antennas 14*a-b* or after a combined evaluation in an RFID apparatus 10 in accordance with FIG. 1.

Actions of the RFID apparatus 10 or of the interrogator during an inventory are shown at the left and actions of the transponder at the right in FIG. 2. The inventory comprises a round of $2^{Q-1}$ slots. At the start of the round, the interrogator also communicates the parameter Q to the transponders that thereupon randomly select a slot. The round then starts in the first slot with the request of the interrogator for communication (Query). A first transponder responds with a random number (RN16) whose reception the interrogator immediately acknowledges (ACK). If the acknowledgment is not given within a certain time duration, for example due to a collision, the first transponder is silent for this round. The first transponder transmits its UII in response to the acknowledgment (ACK). The interrogator now knows the first transponder together with its unique identification parameter and determines the required communication parameter from the RFID signal. The second slot follows in which fully analogously the UII and the communication parameter of a second transponder are detected. In a third slot, the query (QueryRep) of the interrogator remains unanswered because no transponder has randomly selected the third slot. In the fourth slot in turn, a third transponder with UII and communication parameter is found. The inventory accordingly continues over all the slots of the round.

Outside the slots shown in which exactly one transponder is detected or in which all the transponders are silent, there is also the possibility of a collision because a plurality of transponders have randomly selected the same slot. The interrogator recognizes this and has to repeat the inventory, possibly with a different Q.

Figure 3:
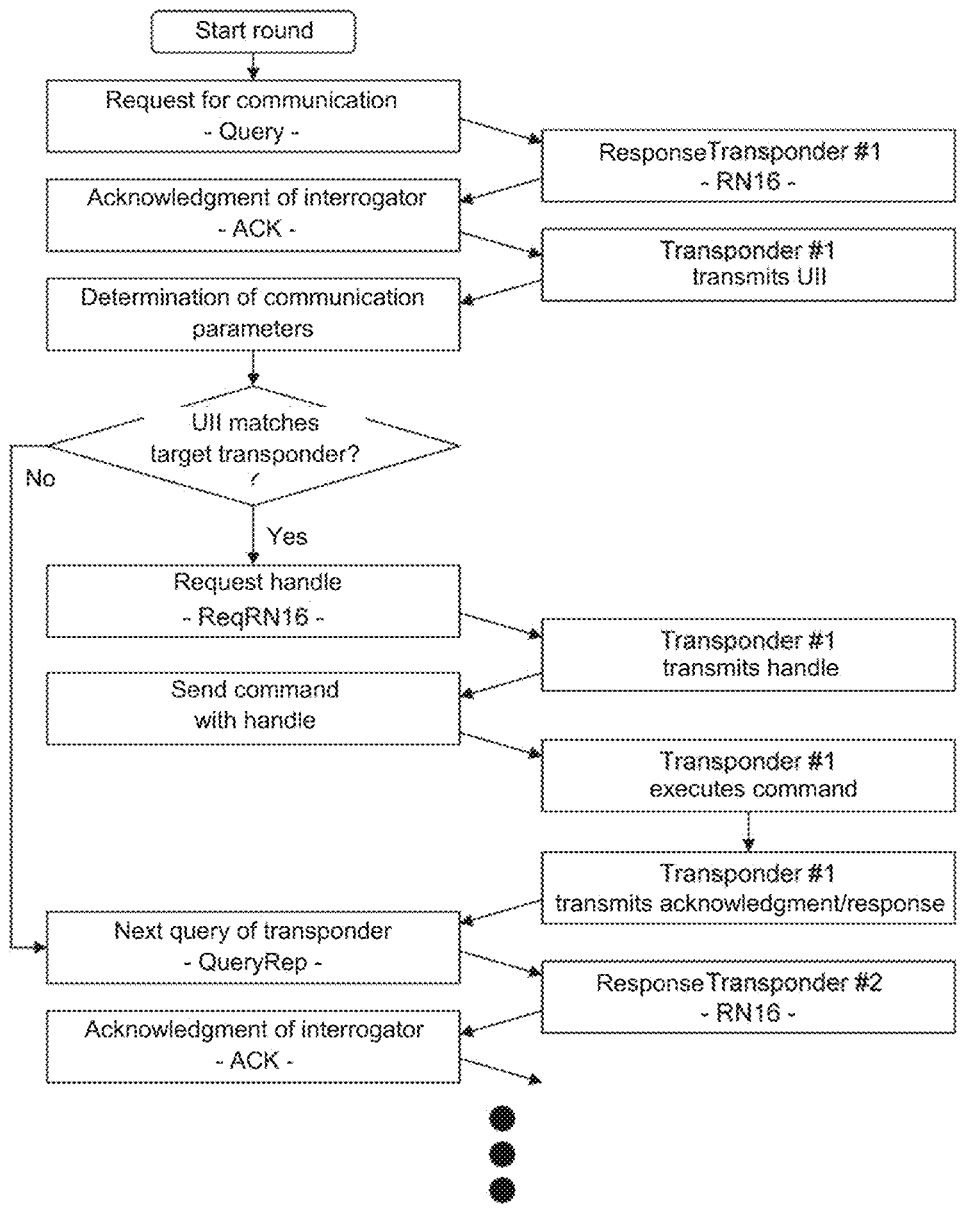
FIG. 3 an exemplary flowchart for an access inventory similar to FIG. 2 in which, however, RFID transponders having a specific UII execute a command.

FIG. 3 shows the routine when the interrogator issues a command to a transponder having a specific UII in the course of an inventory, that is an access inventory. The first steps in a slot in which a transponder responds are the same as in the inventory in accordance with FIG. 2. A query, however, subsequently follows as to whether this UII coincides with the specific UII of the target transponder. If this is the case, the interrogator requests a handle from the transponder and subsequently communicates the command with this handle and the transponder executes the command and subsequently reports the response or an acknowledgment. If, on the other hand, the UII is not correct, the process directly continues in the next slot.

This kind of access requires that the UII is actually unique; however, this is not the case for new transponders as discussed in the introduction. The command is executed on all the transponders having the specific UII. This in particular also applies to a command with which the UII is to be written and thereby initialized.

Figure 4:
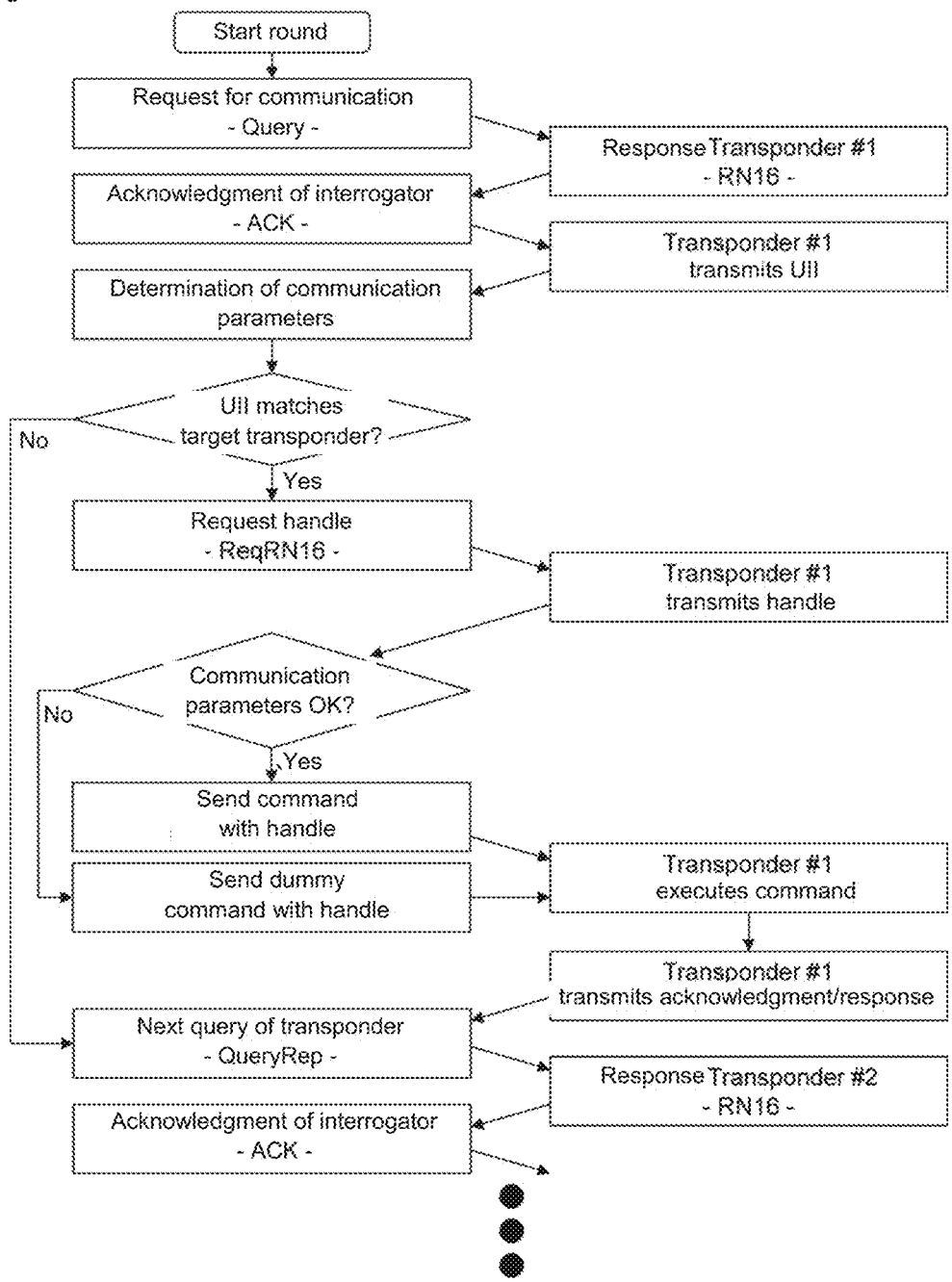
FIG. 4 an exemplary flowchart as an expansion of the access inventory in accordance with FIG. 3 in which the transmission of a command to an RFID transponder is additionally linked to the satisfaction of specific communication parameters.

FIG. 4 shows the routine of an expanded access inventory that additionally carries out a check of communication parameters prior to the actual command (Access). The execution of a command, in particular of a write command for initializing the UII, is therefore linked to an additional condition that is derived from a property of the transponder or from the connection to the transponder.

The routine in accordance with FIG. 3 is therefore expanded after the query whether the transponder communicating in a slot has the desired UII by a further check that checks the communication parameters. A command is only transmitted to the transponder when the communication parameters pass this test; otherwise, the command should not be executed for this transponder despite a coinciding UII. This is advantageously satisfied by a dummy command in the example of FIG. 4. The total routine on the air interface and above all in the internal automatic state devices of the transponder thereby remains as unaffected as possible. The result is, however, the same since the dummy command does not change anything in the transponder and also does not send back any relevant transponder information.

Examples for communication parameters to be checked include the level (RSSI), the phase or an angle in which the transponder is disposed (DOA), with these communication parameters being able to be checked individually or in combination. It can, for example, be demanded as the condition that these values are within a specific corridor. The comparison value is oriented either on communication parameters that were previously detected in an inventory in accordance with FIG. 2. The transponders of the previous inventory are then so-to-say also recognized again with a coinciding UII with reference to their communication parameters. In addition, transponders can be put in an order on the basis of the communication parameters and a transponder can be selected at a specific position of this order or the order can be worked through. One example is DOA and an order from left to right; another example is RSSI and an order from strong to weak, which in specific applications corresponds to near to far. In this respect, auxiliary quantities are also conceivable such as an arrangement of transponders that is determined from images of a camera operated in parallel or that is thus verified or a manual selection in a graphical interface with a visualization of transponder positions.

It is alternatively possible not to carry out an inventory beforehand and to issue the command directly within the expanded access inventory. The condition is then a priori set for the communication parameters such that it provides a singulation, for instance in that a fixed, very narrow angle corridor or a high RSSI threshold is set. It is then practically hardly still conceivable that this condition is randomly satisfied by a plurality of transponders; it is however, simply possible to suitably position a transponder that is, for example, to be initialized by a UII.

The expanded access inventory enables a selection of whether a transponder should be written with the desired data and in particular with an initial UII directly during an inventory, in particular at the point in time of the UII communication, and indeed also when the transponders including their UIIs are identical. Different transponders with identical UIIs respond within different slots during the inventory. The communication properties or communication parameters such as the RSSI, phase angle or DOA can be determined and checked for each one of the transponders using these responses. As illustrated above for a plurality of examples, a responding transponder has to satisfy certain specifications for the communication parameters in order actually to receive the command. A singulation is thereby also possible with identical UIIs. This is in particular used in the initialization to allocate the same UIIs ex works as new and actually in a unique form within the transponder population. The RFID communication can then also again take place in accordance with the standard and thus without a check of communication parameters because the UII is sufficient for the singulation.

The invention claimed is:

1. An RFID apparatus for communicating with at least one RFID transponder, the RFID apparatus comprising:
    an RFID transceiver for radiating and receiving RFID signals; and
    a control unit that is configured to encode RFID information into the RFID signal in accordance with an RFID protocol or to read it from the RFID signal and a singulation process is implemented in the control unit, with the singulation process being adapted to give a command to only one respective RFID transponder, and with the command given to only one respective RFID transponder in instances in which plural transponders have identical identification parameters,
    wherein the singulation process checks a communication parameter of the RFID signal itself that is independent of RFID information encoded in the RFID signal,
    wherein the RFID apparatus is configured for the UHF range in accordance with ISO 180000-6,
    wherein the control unit is configured to determine the communication parameter during an inventory,
    and wherein the inventory divides a time duration of a round into a plurality of slots and the control unit acknowledges the response in each slot, provided that exactly one RFID transponder responds therein, and subsequently receives the unique identification parameter UII of the responding RFID transponder.

2. The RFID apparatus in accordance with claim 1, wherein the communication parameter is one of a level and a phase of the RFID signal.

3. The RFID apparatus in accordance with claim 1, wherein the communication parameter is a direction from which the RFID signal is received.

4. The RFID apparatus in accordance with claim 1, wherein the control unit is configured to check the communication parameter in an expanded inventory for the output of commands to a specific RFID transponder.

5. The RFID apparatus in accordance with claim 1, wherein the control unit is configured to give a write command for setting the unique identification parameter UII to a specific RFID transponder.

6. The RFID apparatus in accordance with claim 1, wherein the control unit is configured to select RFID transponders having a predefined unique identification parameter UII.

7. The RFID apparatus in accordance with claim 1, wherein the control unit is configured to start an initialization with write commands for setting the unique identification parameter UII when more than one RFID transponder responds with the same unique identification parameter UII.

8. The RFID apparatus in accordance with claim 1, wherein the control unit is configured to give a dummy command to a responding RFID transponder having a correct unique identification parameter UII, but not having a matching communication parameter.

9. An RFID apparatus for communicating with at least one RFID transponder, the RFID apparatus comprising:
    an RFID transceiver for radiating and receiving RFID signals; and
    a control unit that is configured to encode RFID information into the RFID signal in accordance with an RFID protocol or to read it from the RFID signal and a singulation process is implemented in the control unit, with the singulation process being adapted to give a command to only one respective RFID transponder, and with the command given to only one respective RFID transponder in instances in which plural transponders have identical identification parameters,
    wherein the singulation process checks a communication parameter of the RFID signal itself that is independent of RFID information encoded in the RFID signal,
    wherein the RFID apparatus is configured for the UHF range in accordance with ISO 180000-6,
    and wherein the control unit is configured to give a dummy command to a responding RFID transponder having a correct unique identification parameter UII, but not having a matching communication parameter.

10. The RFID apparatus in accordance with claim 9, wherein the inventory divides a time duration of a round into a plurality of slots and the control unit acknowledges the response in each slot, provided that exactly one RFID transponder responds therein, and subsequently receives the unique identification parameter UII of the responding RFID transponder.

11. The RFID apparatus in accordance with claim 9, wherein the communication parameter is one of a level and a phase of the RFID signal.

12. The RFID apparatus in accordance with claim 9, wherein the communication parameter is a direction from which the RFID signal is received.

13. The RFID apparatus in accordance with claim 9, wherein the control unit is configured to check the communication parameter in an expanded inventory for the output of commands to a specific RFID transponder.

14. The RFID apparatus in accordance with claim 9, wherein the control unit is configured to give a write command for setting the unique identification parameter UII to a specific RFID transponder.

15. The RFID apparatus in accordance with claim 9, wherein the control unit is configured to select RFID transponders having a predefined unique identification parameter UII.

16. The RFID apparatus in accordance with claim 9, wherein the control unit is configured to start an initialization with write commands for setting the unique identification parameter UII when more than one RFID transponder responds with the same unique identification parameter UII.

17. A method for communicating with at least one RFID transponder,
    wherein RFID signals are transmitted to the RFID transponder and are received by the RFID transponder, wherein RFID information is encoded in the RFID signals in accordance with an RFID protocol, and wherein a command is given to only one respective RFID transponder on the basis of a singulation process, and with the command given to only one respective RFID transponder in instances in which plural transponders have identical identification parameters,
    wherein the singulation process checks a communication parameter of the RFID signal itself that is independent of RFID information encoded in the RFID signal, wherein the RFID protocol is that of ISO 180000-6 that determines communication parameters during an inventory and that is checked in an expanded inventory for the output of commands to a specific RFID transponder, and wherein the inventory divides a time duration of a round into a plurality of slots and the control unit acknowledges the response in each slot, provided that exactly one RFID transponder responds therein, and subsequently receives the unique identification parameter UII of the responding RFID transponder.

18. The method in accordance with claim 17,
wherein the communication parameter is a level of the RFID signal, a phase or a direction from which the RFID signal is received.

19. The method in accordance with claim 17,
wherein a write command for setting the unique identification parameter UII is given respectively individually to the RFID transponders in the expanded inventory to initialize a population of RFID transponders.

* * * * *